United States Patent [19]

Konagaya et al.

[11] Patent Number: 5,434,000
[45] Date of Patent: Jul. 18, 1995

[54] BIAXIALLY ORIENTED POLYESTER FILM

[75] Inventors: Shigeji Konagaya; Yasuhiro Nishino; Hideto Ohashi, all of Tsuruga, Japan

[73] Assignee: Toyo Boseki Kabushiki Kaisha, Osaka, Japan

[21] Appl. No.: 96,222

[22] Filed: Jul. 26, 1993

[30] Foreign Application Priority Data

Jul. 30, 1992 [JP] Japan ................... 4-204058
May 19, 1993 [JP] Japan ................... 5-117469

[51] Int. Cl.$^6$ .......... B32B 5/16; B32B 27/36; B32B 27/06; G11B 5/704
[52] U.S. Cl. ................ 428/329; 428/323; 428/328; 428/331; 428/480; 428/694 ST; 428/694 SL; 428/910; 528/279; 528/280; 528/282; 528/283; 524/444; 524/492; 524/493; 524/497; 524/442
[58] Field of Search .......... 428/697, 694 SL, 694 ST, 428/696, 699, 323, 480, 910; 528/274, 282, 283; 524/442, 444, 445, 450, 492, 789, 493, 405, 406, 413, 435, 437, 497, 783, 785, 786

[56] References Cited

U.S. PATENT DOCUMENTS

| | | |
|---|---|---|
| 4,221,768 | 9/1980 | Inoue et al. ............... 423/239 |
| 4,292,290 | 9/1981 | Tunison, III ............... 423/336 |
| 4,670,319 | 6/1987 | Katoh et al. ............... 428/141 |
| 4,699,770 | 10/1987 | Weston ............... 423/135 |
| 4,895,763 | 1/1990 | Aoyama et al. ............... 428/405 |
| 4,970,182 | 11/1990 | Shirasaki ............... 501/134 |
| 4,990,400 | 2/1991 | Endo et al. ............... 428/331 |
| 5,169,619 | 12/1992 | Yoshimoto et al. ............... 423/610 |
| 5,179,051 | 1/1993 | Bedard et al. ............... 501/128 |
| 5,236,683 | 8/1993 | Nakazawa et al. ............... 423/335 |
| 5,268,135 | 12/1993 | Sasaki et al. ............... 264/210.7 |

*Primary Examiner*—Paul J. Thibodeau
*Assistant Examiner*—Vivian Chen
*Attorney, Agent, or Firm*—Foley & Lardner

[57] ABSTRACT

A biaxially oriented polyester film of a polyester composed of an aromatic dicarboxylic acid as a major acid component and at least one glycol component, said polyester film containing 100–20000 ppm of a particulate compound oxide composed of two or more metals (selected from Al, B, Si, Ti, Zr, W, and Fe) and oxygen whose average primary particle diameter is 0.005–0.1 μm. The compound oxide contains 0.1–5 wt % by weight of chlorine. The polyester film finds use as a base film for magnetic tape with improved scratch resistance.

8 Claims, 1 Drawing Sheet

BIAXIALLY ORIENTED POLYESTER FILM

BACKGROUND OF THE INVENTION

1. Field of the Invention

The present invention relates to a biaxially oriented polyester film with improved scratch resistance.

2. Description of the Prior Art

Magnetic tape is produced from a biaxially oriented polyester film incorporated with a particulate organic or inorganic compound as a lubricant. There is an increasing demand for magnetic tape with good scratch resistance. Scratches are due to the rubbing of magnetic tape against metal or plastic guide pins, particularly in the case of high-speed dubbing. Scratches are also due to fine particles which have dropped off from magnetic tape during its run. Moreover, magnetic tape with poor scratch resistance is liable to drop-out because it easily wears in its manufacturing process. Therefore, improved scratch resistance is prerequisite for quality magnetic tape.

One of the known ways of improving scratch resistance is by the incorporation of polyester base film with fine particles as a lubricant. They may be inert ones having a specific hardness (e.g., Mohs hardness higher than 6) or particulate alumina taking a specific crystal form (e.g., δ-alumina or γ-alumina). (See Japanese Patent Kokai Nos. 311131/89, 8238/91, and 6239/91.) The improvement in scratch resistance by this way is effective when magnetic tape is rubbed against plastic guide pins, but not so effective when it is rubbed against metal guide pins during high-speed dubbing. This indicates that the above-mentioned specific fine powder or alumina is not effective in improving the scratch resistance of polyester film.

SUMMARY OF THE INVENTION

It is an object of the present invention to provide a biaxially oriented polyester film as a base film for magnetic tape which is less liable to surface scratch at the time of high-speed dubbing.

The present invention is based on the results of the studies approaching the problem from the view point of lubricant or filler contained in polyester film.

The gist of the present resides in a biaxially oriented polyester film of a polyester composed of an aromatic dicarboxylic acid as a major acid component and at least one glycol component, said polyester film containing 100–20000 ppm of a particulate compound oxide composed of two or more metals and oxygen whose average primary particle diameter is 0.005–0.1 μm, preferably, from 0.005 to less than 0.1 μm.

In a preferred embodiment of the present invention, the compound oxide contains at least two metals selected from Al, B, Si, Ti, Zr, W, and Fe.

In another preferred embodiment of the present invention, the compound oxide is one which contains 20–90 mol % of Al.

In another preferred embodiment of the present invention, the compound oxide is at least one species selected from those which are each composed mainly of Al and Si; Al and Tl; Al and Zr; Al and Fe; Al, Si, and Ti; Al, Ti, and Zr; Al, Si, and Zr; Al, Si, and Fe; or Al, Ti, and Fe.

In another preferred embodiment of the present invention, the compound oxide contains 0.01–5 wt % of chlorine.

In another preferred embodiment of the present invention, the compound oxide is a substantially amorphous one composed mainly of Al, Si, and O in which the molar ratio of Al to the total amount of Al and Si is in the range of 0.3–0.9.

DETAILED DESCRIPTION OF THE INVENTION

Figure 1:
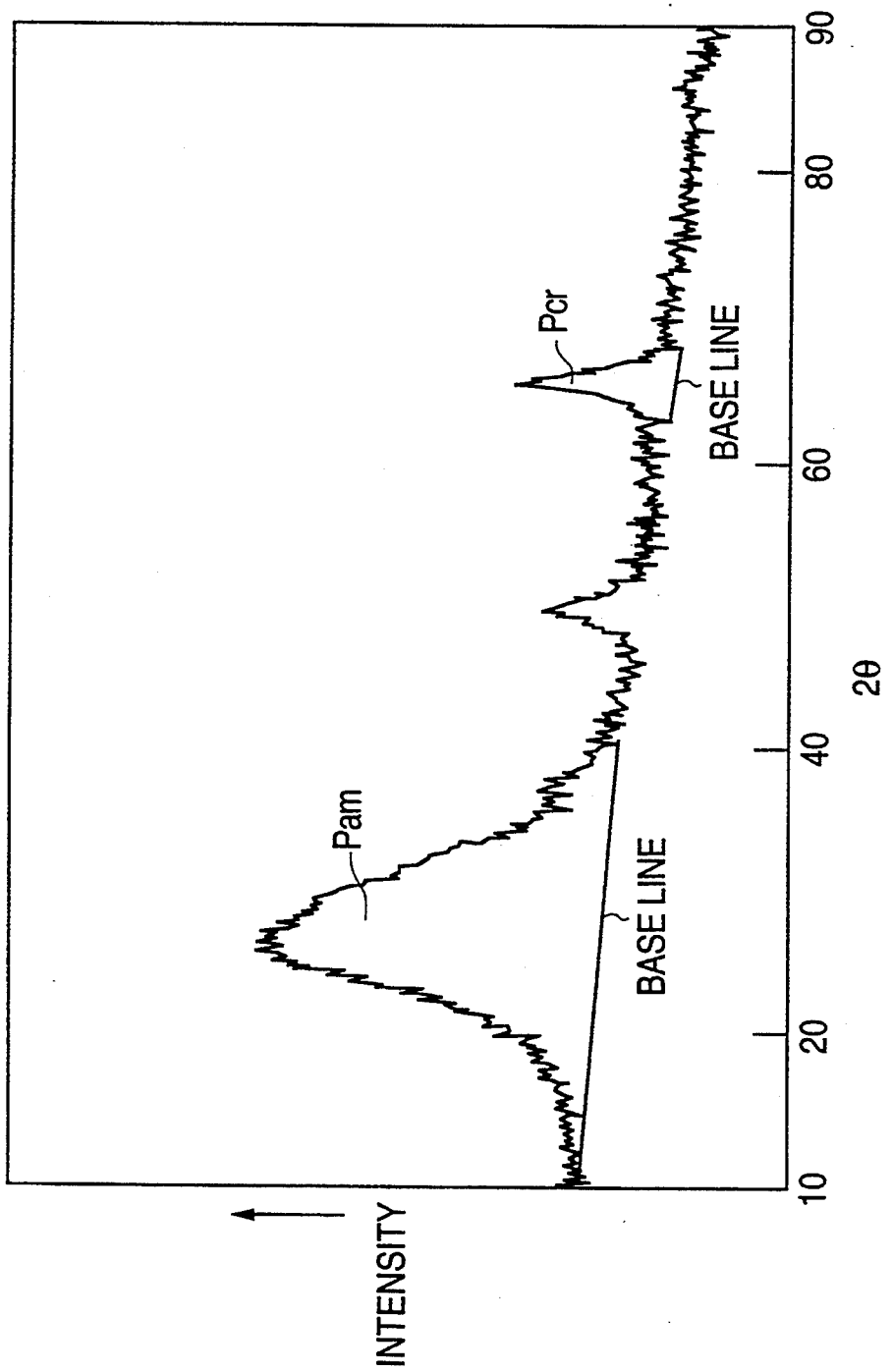
FIG. 1 is an X-ray diffraction chart in which the intensity is plotted against the scattering angle $2\theta$.

The biaxially oriented polyester film of the present invention is produced from a polyester which is composed of an aromatic dicarboxylic acid as a major acid component and at least one glycol component. The polyester should preferably be one in which the ethylene terephthalate units (composed of terephthalic acid and ethylene glycol) account for more than 95 mol %. Preferably it may also be ethylene naphthalate (consisting of naphthalene dicarboxylic acid and ethylene glycol).

Examples of the acid component other than terephthalic acid include dicarboxylic acids (such as isophthalic acid, p-β-oxyethoxybenzoic acid, 2,6-naphthalenedicarboxylic acid, 4,4-dicarboxydiphenyl, 4,4-dicarboxylbenzophenone, bis(4-carboxyphenyl)ethane, adipic acid, sebacic acid, 5-sodium sulfoisophthalic acid, and cyclohexane-1,4-dicarboxylic acid) and oxycarboxylic acids (such as p-oxybenzoic acid). Examples of the glycol component other than ethylene glycol include propylene glycol, butanediol, neopentyl glycol, diethylene glycol, cyclo-hexanedimethanol, ethylene oxide adduct of bisphenol A, polyethylene glycol, and polytetramethylene glycol. The polyester may contain, in addition to the above-mentioned two major components, a small amount of compounds having an amide linkage, urethane linkage, ether linkage, or carbonate linkage.

The compound oxide used in the present invention may be produced in several ways, such as inhomogeneous coprecipitation process involving hydrolysis by ammonia water of an aqueous solution containing an aluminum salt and silicon salt, homogeneous precipitation process involving hydrolysis by urea in place of ammonia water, process involving the mixing of aluminum hydroxide and silicon hydroxide, process involving the immersing of either of aluminum oxide or silicon oxide in an solution of the other, process involving additional steps of adding ammonia water and calcining the product, and process involving the burning of a covalent chloride (such as $AlCl_3$ and $SiCl_4$) in the presence of hydrogen and oxygen. The last one is most desirable.

The compound oxide used in the present invention should preferably contain 0.01–5 wt % of chlorine. Chlorine helps the particles of the compound oxide to readily disperse in the polyester, with the resulting polyester having improved wear and scratch resistance. Chlorine less than 0.01 wt % is too small to achieve complete dispersion required for good wear and scratch resistance. Chlorine in excess of 5 wt % causes the polyester to pyrolize during its polymerization and processing into film. The chlorine content may be properly controlled by selecting the starting materials and burning conditions.

The compound oxide prepared as mentioned above considerably differs in structure from the simple mixture of the individual constituent metal oxides. In other words, it has the structure in which two different metals are connected by oxygen as represented by Al-O-Si. Moreover, it contains the individual oxides mostly in the amorphous form, depending on the ratio of the constituent metals.

In this specification, the compound oxide is represented by $Al_2O_3/SiO_2$, for example. It is composed almost entirely of amorphous oxides lacking crystalline structure. It may be a double or a triple oxide. The former includes $SiO_2/ZrO_2$, $SiO_2/Fe_2O_3$, $TiO_2/Fe_2O_3$, $Al_2O_3/SiO_2$, $Al_2O_3/TiO_2$, $Al_2O_3/ZrO_2$, and $Al_2O_3/Fe_2O_3$. The latter includes $Al_2O_3/SiO_2/Fe_2O_3$, $Al_2O_3/SiO_2/TiO_2$, $Al_2O_3/TiO_2/ZrO_2$, and $Al_2O_3/SiO_2/ZrO_2$. It may also be one which is composed of more than three oxides. Of these compound oxides, those which contain aluminum are desirable because of their ability to improve scratch resistance. $Al_2O_3/SiO_2$ is most desirable of all. It should preferably contain aluminum such that the molar ratio of aluminum to the total amount of aluminum and silicon is 0.3–0.9.

The compound oxide is said to be "amorphous" if the ratio given by $P_{am}/(P_{cr}+P_{am})$ is greater than 0.7, where $P_{am}$ is the broad peak area for $2\theta=10°-45°$ and $P_{cr}$ is the sharp peak area for $2\theta=60°-70°$, in the X-ray diffraction chart as shown in FIG. 1.

The compound oxide may take any particle shape.

The compound oxide may contain as its by-produces single oxides of individual constituent metals, such as $Al_2O_3$, $SiO_2$, $B_2O_3$, $TiO_2$, $ZrO_2$, $WO_3$, and $Fe_2O_3$. They have no adverse effect so long as they are smaller than 0.1 μm in average primary particle diameter. Their crystal form is not specifically limited.

According to the present invention, the compound oxide should have an average primary particle diameter smaller than 0.1 μm, preferably in the range of 0.005–0.05 μm. An excessively coarse species of the compound oxide aggravates the slittability of the polyester film and causes drop-out. Conversely, an excessively fine species of the compound oxide tends to agglomerate during polymerization and contributes little to the improvement in scratch resistance. (Agglomeration forms projections on the film surface which cause scratching and drop-out.)

The term "average primary particle diameter" means an average particle diameter of discrete particles. (It does not mean the diameter of secondary aggregates.) It is expressed as an arithmetic mean of average particle diameters observed under an electron microscope. The compound oxide should preferably have a particle diameter distribution which is close to that of monodisperse one, so that it provides good scratch resistance.

According to the present invention, the biaxially oriented polyester film should contain the compound oxide in an amount of 100–20000 ppm, preferably 1000–5000 ppm. With an amount less than 100 ppm, the compound oxide does not impart sufficient scratch resistance to the polyester film. With an amount in excess of 20000 ppm, the compound oxide drops off from the polyester film and scratches it during its run. In addition, it aggravates the heat resistance of the polyester film. Incidentally, in the case where the polyester film is used in the form of laminate, the content is that in the outermost layer but is not that in all the layers.

The compound oxide may undergo surface treatment to prevent its agglomeration or improve its affinity for polyester. Chemicals for surface treatment include phosphoric acid and derivatives thereof (such as phosphoric esters, alkali metal phosphate, and ammonium phosphate), ammonium polyacrylate, ammonium polymethacrylate, alkali metal hydroxide, silane coupling agent, and titanium coupling agent. Of these examples, sodium hydroxide is most desirable. The surface treatment should be used in an amount less than 5 wt % of the compound oxide.

The biaxially oriented polyester film of the present invention may optionally contain as a lubricant an inert inorganic or organic compound in particulate form, in addition to the compound oxide. It includes calcium carbonate, barium sulfate, calcium fluoride, talc, kaolin, titanium oxide, silicon oxide, alumina, crosslinked polystyrene, crosslinked polymethacrylate ester, and crosslinked acrylate ester. Of these compounds, silicon oxide (in the form of spherical particles) and calcium carbonate are desirable for improved running properties and kaolin is desirable for improved scratch resistance.

The calcium carbonate that can be used includes calcite (which takes the trigonal or hexagonal crystal form), aragonite (which takes the rhombic crystal form), and vaterite (which takes the hexagonal or pseudo-hexagonal crystal form). Its particles may be in the form of rosary, cube, spindle, column, needle, sphere, or oval.

The kaolin may be natural one, synthetic one, calcined one or uncalcined one. It may take any shape (such as plate, column, sphere, spindle, and oval).

The amount of the inert inorganic or organic compound in the biaxially oriented polyester film should be 500–10000 ppm, preferably 1500–7000 ppm. An amount less than 500 ppm is not enough to provide desired slip characteristics. An amount in excess of 10000 ppm leads to the polyester film decreasing in wear resistance due to coarse projections on the film surface. In the case where the polyester film is used in the form of laminate, the content is that in the outermost layer but is not that in all the layers.

The biaxially oriented polyester film of the present invention may optionally contain at least one kind of $Al_2O_3$, $SiO_2$, $TiO_2$, $ZrO_2$, and $Fe_2O_3$ in the form of ultrafine particles having an average primary particle diameter smaller than 0.1 μm, so that it has further improved scratch resistance. Alumina for this purpose includes crystalline alumina hydrate (such as gibbsite, bialite, nordstrandite, boehmite, diaspore, and toddire), amorphous alumina hydrate (such as amorphous gel, boehmite gel, and bialite gel), intermediary activated alumina (of $\rho$, $\eta$, $\gamma$, $\chi$, $\delta$ or $\theta$ form), $\gamma$-alumina. Of these examples, $\delta$- and $\gamma$-alumina are desirable.

The ultrafine particles together with the compound oxide should be used in an amount less than 20000 ppm. If the total amount exceeds 20000 ppm, the compound oxide drops off from the polyester film and scratches it during its run. In addition, it aggravates the heat resistance of the polyester film. Incidentally, in the case where the polyester film is used in the form of laminate, the content is that in the outermost layer but is not that in all the layers.

The polyester from which the biaxially oriented polyester film of the present invention is produced may optionally be incorporated with at least one of alkali metal hydroxide or salt or alkaline earth metal salt and ae least one of phosphoric acid, alkyl phosphate, and derivatives thereof, in order to improve the dispersibility of the slip agent (i.e., the compound oxide and inert inorganic or organic compound in particulate form) and to improve the electrostatic nipping property of the polyester film. The total amount of these additives should be such that the molar ratio calculated by dividing the amount of phosphoric acid, alkyl phosphate, or derivative thereof by the sum of half the amount of alkali metal and the amount of alkaline earth metal, is in the range of 0.4–1.0. If the molar ratio is outside this range, the particles added are liable to agglomeration and the resulting coarse particles bring about drop-out.

The compound oxide may be incorporated into the polyester resin by polymerization in the presence of the compound oxide or by mixing the polyester resin in molten state with the compound oxide. The former method is desirable to thoroughly disperse the compound oxide into the polyester resin. In practice, the compound oxide is added to the reaction system in the form of slurry in the glycol component. When to add depends on the kind and particle diameter of the compound oxide, the chlorine content, and the slurry concentration and temperature. The adequate time is before the start of polymerization.

The above-mentioned surface treatment should be added to the slurry composed of the glycol component and the compound oxide so that it improves the dispersion of the compound oxide in the polyester resin. A better result will be obtained if the slurry is heated to the boiling point of the glycol component.

The biaxially oriented polyester film of the present invention may be produced in any manner. First, polyester film is produced from a polyester resin incorporated with the compound oxide and the inert inorganic or organic compound (which is optional). Then, the polyester film is drawn in the longitudinal and transverse directions sequentially or simultaneously the usual way. It is possible to combine sequential drawing with simultaneous one. Drawing is usually followed by heat treatment in a tenter at 190°–230° C. for 2–10 seconds. Heat treatment should preferably be accompanied by additional drawing (2–30%) in the longitudinal or transverse direction. Heat treatment may optionally be followed by relaxation in the transverse direction at 130°–170° C. in a tenter and relaxation in the longitudinal direction at 80°–150° C. on a heating roll.

The biaxially oriented polyester film produced as mentioned above may also be used as the outermost layer (0.05–10 μm) of multi-layered film. For producing multi-layered film co-extrusion method or coating method is preferably used.

The biaxially oriented polyester film of the present invention contains the above-specified amorphous compound oxide in particulate form with an average primary particle diameter of 0.00–0.1 μm, which has good affinity for polyester and has no adverse effect on film slittability. It is used as a base film for magnetic tape. The resulting magnetic tape has greatly improved resistance to scratch by plastic and metal guide pins.

EXAMPLES

To further illustrate the invention, and not by way of limitation, the following examples are given. In the examples quantities are expressed in parts by weight.

The test methods used in the examples are explained first.

(1) Average primary particle diameter of the compound oxide and inorganic compound (as lubricant) Measured using a transmission electron microscope (×100,000) made by Hitachi Ltd. and expressed in terms of average of more than 100 measurements.

(2) Amount of chlorine in the compound oxide Determined by ion chromatography (with "IC-100" made by Yokogawa-Hokushin Denki Co., Ltd.) for leachates (filtered through a 0.1 μm filter) resulting from leaching with pure water for one day at room temperature.

(3) Amorphousness of the complex oxide Judged from the results of X-ray diffractometry (under the following conditions) with a high-power X-ray diffractometer (for reflection method) made by Rigaku Denki Co., Ltd.

Cu-Kα rays (through a nickel filter) scattering angle $2\theta = 10°–90°$ voltage and current = 45 kV and 150 mA scanning rate = 2°/minute Expressed in terms of the ratio given by $P_{am}/(P_{cr}+P_{am})$, where $P_{am}$ is the broad peak area for $2\theta = 10°–45°$ and $P_{cr}$ is the sharp peak area for $2\theta = 60°–70°$, in the X-ray diffraction chart as shown in FIG. 1.

(4) Average surface roughness of film Expressed in terms of the center average roughness (Ra: μm) which is measured using a surface roughness meter ("Surfcom 300A" made by Tokyo Seimitshu Co., Ltd.) with a needle diameter of 1 μm, a load of 0.07 g, a standard length of 0.8 mm, and a cut-off of 0.08 mm.

(5) Slip properties of film Expressed in terms of the coefficient of static friction between two sheets of film, measured according to ASTM D-1894-63 using a sled-type strip tester at 23° C. and 65 RH %.

(6) Slittability Rated according to the following criteria by observing the edges of tape slit ½ inch wide.

1 . . . No hairs and chips on edges.

2 . . . Some hairs and chips on edges.

3 . . . Many hairs and chips on edges.

(7) Resistance to scratch by metal guide pins Rated according to the following criteria by directly observing under a stereoscopic microscope the surface of the sample tape (slit 10 mm wide) which had been rubbed once over a metal guide pin (Fe-Cr) through 45° at a running speed of 300 m/min under a tension of 100 g.

1 . . . No scratches

2 . . . Few scratches

3 . . . Some scratches

4 . . . Many scratches (8) Resistance to scratch by plastic guide pins Rated according to the following criteria by photographing under a stereoscopic microscope the aluminum-deposited surface of the sample tape (slit 10 mm wide) which had been rubbed once over a plastic guide pin (Fe-Cr) through 90° at a running speed of 150 m/min under a tension of 100 g.

1 . . . No scratches

2 . . . Few scratches

3 . . . Some scratches

4 . . . Many scratches

Those samples rated as 1 and 2 are acceptable.

Example 1

[Preparation of polyester composition (a)]

A compound oxide in particulate form was prepared from $AlCl_3$ and $SiCl_4$ by vapor-phase reaction with hydrogen and oxygen. It has an average primary particle diameter of 0.02 μm and an Al/(Al+Si) molar ratio of 0.58. (In Table 1, the molar ratio of a double salt is expressed in the general form of A/(A+B), where A denotes either of a metal component or silicon and B denotes the other.) The compound oxide was ground by wet process in ethylene glycol to give a 20 wt % slurry having an average particle diameter of 0.05 μm.

Esterification was performed on 100 parts of terephthalic acid and 70.7 parts of ethylene glycol at 250° C. and 2.5 kg/cm² in the presence of 0.0697 parts of antimony trioxide, 0.271 parts of triethyleneamine, and 0.0931 parts of magnesium acetate (all by weight). The resulting ester solution was mixed with 0.0327 parts by weight of trimethylphosphate for 30 minutes at 260° C. under normal pressure. The above-mentioned slurry was added in such an amount that the concentration of the compound oxide was 2 wt %. Polycondensation was carried out by stirring for 30 minutes in vacuo to give a polyethylene terephthalate composition (designated as polyester composition (a)) having an intrinsic viscosity $\eta = 0.60$.

[Preparation of polyester composition (b)]

The same procedure as above was repeated except that the compound oxide was replaced by calcium carbonate (as an inorganic compound powder) having an average particle diameter of 0.45 μm. There was obtained a polyethylene terephthalate composition (designated as polyester composition (b)) containing 2% calcium carbonate and having an intrinsic viscosity $\eta = 0.62$.

[Preparation of polyester composition (c)]

The same procedure as above was repeated except that the compound oxide was replaced by kaolin (as an inorganic compound powder) having an average particle diameter of 0.4 μm. There was obtained a polyethylene terephthalate composition (designated as polyester composition (c)) containing 2% kaolin and having an intrinsic viscosity $\eta = 0.61$.

[Preparation of polyester composition (d)]

The same procedure as above was repeated except that the compound oxide was not added. There was obtained a polyethylene terephthalate composition (designated as polyester composition (d)) having an intrinsic viscosity $\eta = 0.62$.

The polyester compositions (a), (b), (c), and (d) obtained as mentioned above were mixed in a specific ratio (by weight) such that the resulting mixture contains the compound oxide, calcium carbonate, and kaolin in a molar ratio and concentrations as shown in Table 1. The mixture was dried and melted at 280° C. and cast onto a cooling drum at 30° C. to give a 220 μm thick film. This film was drawn 3.3 times in the longitudinal direction between a low-speed roll and a high-speed roll after heating by a hot roll at 75° C. and an infrared heater with a surface temperature of 600° C. (placed 20 mm away from the film). The film was drawn again 4.4 times in the transverse direction using a tenter at 100° C. The transverse drawing was followed by heat treatment and redrawing and relaxation in the transverse direction. The film finally underwent relaxation in the longitudinal direction as it passed over a heating roll at 120° C., with its tension properly controlled between the heating roll and the rolls before and behind it. Thus there was obtained a 15 μm thick biaxially oriented polyester film, which has the characteristic properties as shown in Table 1.

Examples 2 to 6

The same procedure as in Example 1 was repeated to give biaxially oriented polyester films except that changes were made as shown in Table 1 in the content of the compound oxide in polyester composition (a), the kind, content, and particle diameter of the inorganic compound in polyester composition (b), and the film making conditions. The results are shown in Table 1.

Comparative Examples 1 to 3

The same procedure as in Example 1 was repeated to give biaxially oriented polyester films except that polyester composition (a) was not used and changes were made as shown in Table 1 in the kind, content, and particle diameter of the inorganic compound in polyester composition (b), and the film making conditions. The results are shown in Table 1.

TABLE 1

| Example No. | Particles of compound oxide | | | | Particles of inorganic compound | | |
|---|---|---|---|---|---|---|---|
| | Type ($A_xO_y/B_mO_n$) | Molar ratio A/(A + B) | Average primary particle diameter (μm) | Content (ppm) | Kind | Average particle diameter (μm) | Content (ppm) |
| Example 1 | $Al_2O_3/SiO_2$ | 0.58 | 0.02 | 4000 | Calcium carbonate | 0.45 | 3000 |
| | | | | | Kaolin | 0.4 | 1000 |
| Example 2 | $Al_2O_3/SiO_2$ | 0.58 | 0.02 | 4000 | Calcium carbonate | 0.45 | 3000 |
| Example 3 | $Al_2O_3/SiO_2$ | 0.57 | 0.015 | 4000 | Calcium carbonate | 0.45 | 3000 |
| | | | | | Kaolin | 0.4 | 1000 |
| Example 4 | $TiO_2/SiO_2$ | 0.65 | 0.01 | 3000 | Calcium carbonate | 0.45 | 4000 |
| | | | | | Kaolin | 0.4 | 1000 |
| Example 5 | $Fe_2O_3/SiO_2$ | 0.45 | 0.02 | 3000 | Calcium carbonate | 0.45 | 4000 |
| Example 6 | $Fe_2O_3/TiO_2$ | 0.68 | 0.02 | 5000 | Calcium carbonate | 0.45 | 4000 |
| Compar. Example 1 | — | — | — | — | Calcium carbonate | 0.45 | 3000 |
| | | | | | Kaolin | 0.4 | 1000 |
| Compar. Example 2 | — | — | — | — | Calcium carbonate | 0.45 | 3000 |
| Compar. Example 3 | — | — | — | — | Calcium carbonate | 0.45 | 4000 |

| Example No. | Film properties | | | Scratch resistance | |
|---|---|---|---|---|---|
| | Surface roughness | Coefficient of friction | Slittability | to metal guide pins | to plastic guide pins |
| Example 1 | 0.018 | 0.50 | 1 | 1 | 1 |
| Example 2 | 0.018 | 0.49 | 1 | 1 | 2 |
| Example 3 | 0.018 | 0.50 | 1 | 1 | 1 |
| Example 4 | 0.017 | 0.45 | 1 | 1 | 2 |

TABLE 1-continued

|  | | | | | |
|---|---|---|---|---|---|
| Example 5 | 0.019 | 0.45 | 1 | 2 | 2 |
| Example 6 | 0.018 | 0.46 | 1 | 2 | 2 |
| Compar. Example 1 | 0.018 | 0.48 | 2 | 3 | 3 |
| Compar. Example 2 | 0.017 | 0.47 | 1 | 4 | 4 |
| Compar. Example 3 | 0.019 | 0.45 | 2 | 3 | 3 |

EXAMPLE 7

[Preparation of polyester (A)]

Polyester (A) was prepared in the same manner as in Example 1 using a slurry (115 parts) prepared by mixing in a homogenizer from 100 parts of ethylene glycol and 15 parts of compound oxide of $Al_2O_3/SiO_2$ (=33/66 by weight) containing 0.34 wt % chlorine and having an average particle diameter of 0.06 μm. Thus obtained polyester (A) was processed into a biaxially oriented polyester film in the same manner as in Example 1 under the conditions shown in Table 2. It has the characteristic properties as shown in Table 2.

Examples 8 to 12

The same procedure as in Example 1 was repeated to give biaxially oriented polyester films except that changes were made in the kind, average particle diameter, and amount of the compound oxide in polyester (A) and of the inorganic compound in polyester (B) and the film making conditions. The changes and results are shown in Table 2.

Example 13

[Preparation of polyester composition (A)]

A compound oxide in particulate form was prepared from $AlCl_3$ and $SiCl_4$ by vapor-phase reaction with hydrogen and oxygen. It has an average primary particle diameter of 0.02 μm, an average secondary particle diameter of 0.5 μm, and an Al/Si molar ratio of 66/33. It was examined for amorphousness by X-ray diffractometry. The results are shown in FIG. 1. It was crushed by wet process in ethylene glycol to give a 20 wt % slurry having an average particle diameter of 0.05 μm.

Polyester composition (A) was prepared using this slurry in the same manner as in Example 1. It was processed into a biaxially oriented polyester film in the same manner as in Example 1. Table 3 shows the characteristic properties of the polyester film.

Examples 14 to 22

The same procedure as in Example 1 was repeated to give biaxially oriented polyester films except that changes were made in the kind, average particle diameter, and amount of the compound oxide in polyester composition (A) and of the inorganic compound in polyester composition (B) and the film making conditions. The changes and results are shown in Table 3.

TABLE 2

| Example No. | Type | Weight ratio | Chlorine content (%) | Average primary particle diameter (μm) | Average particle diameter (μm) | Amount (ppm) | Particles of inorganic compound Kind |
|---|---|---|---|---|---|---|---|
| Example 7 | $Al_2O_3/SiO_2$ | 33/66 | 0.32 | 0.02 | 0.06 | 4000 | Calcium carbonate |
| Example 8 | $Al_2O_3/TiO_2$ | 52/38 | 4.66 | 0.02 | 0.05 | 3000 | Calcium carbonate |
| Example 9 | $Al_2O_3/ZrO_2$ | 80/20 | 0.60 | 0.03 | 0.12 | 3000 | Calcium carbonate |
| Example 10 | $Al_2O_3/SiO_2/TiO_2$ | 57/5/38 | 0.78 | 0.02 | 0.05 | 5000 | Calcium carbonate |
| Example 11 | $Al_2O_3/TiO_2/ZrO_2$ | 30/50/20 | 0.35 | 0.03 | 0.08 | 4000 | Calcium carbonate |
| Example 12 | $Al_2O_3/SiO_2/ZrO_2$ | 33/34/33 | 0.80 | 0.015 | 0.06 | 3000 | Calcium carbonate |

| Example No. | Average particle diameter (μm) | Amount (ppm) | Surface roughness | Coefficient of friction | scratch resistance to metal guide pins | Scratch resistance to plastic guide pins |
|---|---|---|---|---|---|---|
| Example 7 | 0.45 | 4000 | 0.018 | 0.45 | 1 | 1 |
| Example 8 | 0.45 | 4000 | 0.017 | 0.45 | 1 | 1 |
| Example 9 | 0.45 | 4000 | 0.019 | 0.43 | 2 | 2 |
| Example 10 | 0.45 | 4000 | 0.018 | 0.46 | 2 | 2 |
| Example 11 | 0.45 | 4000 | 0.017 | 0.42 | 1 | 2 |
| Example 12 | 0.45 | 4000 | 0.018 | 0.46 | 1 | 2 |

TABLE 3

| Example No. | Particles of compound oxide | | | | Particles of inorganic compound | | | Film properties | | Scratch resistance to metal guide pins | Scratch resistance to plastic guide pins |
|---|---|---|---|---|---|---|---|---|---|---|---|
| | Type | Molar ratio Al/(Al + Si) | Amorphousness | Average particle dia. (μm) | Content (ppm) | Kind | Average particle dia. (μm) | Content (ppm) | Surface roughness | Coefficient of friction | | |
| Example 13 | Al/Si | 0.44 | 0.99 | 0.089 | 4000 | Calcium carbonate / Kaolin | 0.45 / 0.4 | 3000 / 1000 | 0.018 | 0.50 | 1 | 1 |
| Example 14 | Al/Si | 0.58 | 0.96 | 0.083 | 4000 | Calcium carbonate / Kaolin | 0.45 / 0.4 | 3000 / 1000 | 0.018 | 0.49 | 1 | 1 |
| Example 15 | Al/Si | 0.67 | 0.94 | 0.085 | 4000 | Calcium carbonate / Kaolin | 0.45 / 0.4 | 3000 / 1000 | 0.018 | 0.50 | 1 | 1 |
| Example 16 | Al/Si | 0.72 | 0.92 | 0.075 | 3000 | Calcium carbonate / Kaolin | 0.45 / 0.4 | 4000 / 1000 | 0.017 | 0.45 | 1 | 1 |
| Example 17 | Al/Si | 0.80 | 0.91 | 0.049 | 3000 | Calcium carbonate | 0.45 | 4000 | 0.019 | 0.45 | 1 | 2 |
| Example 18 | Al/Si | 0.90 | 0.75 | 0.069 | 5000 | Calcium carbonate | 0.45 | 4000 | 0.018 | 0.46 | 1 | 2 |
| Example 19 | Al/Si | 0.80 | 0.91 | 0.069 | 4000 | Calcium carbonate | 0.45 | 4000 | 0.017 | 0.42 | 1 | 2 |
| Example 20 | Al/Si | 0.67 | 0.94 | 0.076 | 3000 | Calcium carbonate | 0.45 | 4000 | 0.015 | 0.48 | 1 | 2 |
| Example 21 | Al/Si | 0.72 | 0.92 | 0.069 | 4000 | Spherical silica | 0.40 | 2500 | 0.020 | 0.40 | 1 | 1 |
| Example 22 | Al/Si | 0.80 | 0.91 | 0.063 | 4000 | Kaolin | 0.40 | 4000 | 0.016 | 0.55 | 1 | 1 |

What is claimed is:

1. A biaxially oriented polyester film of a polyester composed of an aromatic dicarboxylic acid as a major acid component and at least one glycol component, said polyester film containing 100–20000 ppm of a particulate compound oxide composed of two or more metals and oxygen whose average primary particle diameter is 0.005–0.1 μm wherein the compound oxide contains at least two metal oxide selected from the group consisting of $Al_2O_3$, $B_2O_3$, $SiO_2$, $TiO_2$, $ZrO_2$, $WO_3$, and $Fe_2O_3$, and wherein the compound oxide contains 0.01–5% by weight of chlorine.

2. A biaxially oriented polyester film as defined in claim 1, wherein the compound oxide contains 20–90 mol % of Al.

3. A biaxially oriented polyester film as defined in claim 2, wherein the compound oxide consists essentially of at least one species selected from the group consisting of $Al_2O_3/SiO_2$; $Al_2O_3/TiO_2$; $Al_2O_3/ZrO_2$; $Al_2O_3/Fe_2O_3$; $Al_2O_3/SiO_2/TiO_2$; $Al_2O_3/TiO_2/ZrO_2$; $Al_2O_3/SiO_2/ZrO_2$; $Al_2O_3/SiO_2/Fe_2O_3$; and $Al_2O_3/TiO_2/Fe_2O_3$.

4. A biaxially oriented polyester film as defined in any of claim 1, wherein the compound oxide is an amorphous oxide consisting essentially of $Al_2O_3/SiO_2$ in which the molar ratio of Al to the total amount of Al and Si is 0.3–0.9.

5. A biaxially oriented polyester film according to claim 1 wherein the average primary particle diameter is from 0.005 to less than 0.1 μm.

6. A multi-layered biaxially oriented polyester film wherein the polyester film according to claim 1 is at least one of the outermost layers of the multi-layered film.

7. A biaxially oriented polyester film according to claim 1 wherein the polyester is polyethylene terephthalate or polyethylene naphthalate.

8. A biaxially oriented polyester film according to claim 1 wherein a magnetic recording layer is further provided on a surface.

* * * * *